US009087236B2

(12) United States Patent
Dhoolia et al.

(10) Patent No.: US 9,087,236 B2
(45) Date of Patent: Jul. 21, 2015

(54) AUTOMATED RECOGNITION OF PROCESS MODELING SEMANTICS IN FLOW DIAGRAMS

(75) Inventors: Pankaj Dhoolia, Uttar Pradesh (IN); Juhnyoung Lee, Yorktown Heights, NY (US); Debdoot Mukherjee, Kolkata (IN); Aubrey J. Rembert, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 12/881,120

(22) Filed: Sep. 13, 2010

(65) Prior Publication Data
US 2012/0062574 A1    Mar. 15, 2012

(51) Int. Cl.
*G06F 9/44* (2006.01)
*G06K 9/00* (2006.01)

(52) U.S. Cl.
CPC .............. *G06K 9/00476* (2013.01); *G06F 8/10* (2013.01); *G06F 8/20* (2013.01); *G06F 8/30* (2013.01)

(58) Field of Classification Search
USPC ........................................................ 717/100
See application file for complete search history.

(56) References Cited

U.S. PATENT DOCUMENTS

| | | | | |
|---|---|---|---|---|
| 5,233,513 A * | 8/1993 | Doyle | ........................... | 705/7.11 |
| 2002/0100014 A1* | 7/2002 | Iborra et al. | ................... | 717/104 |
| 2003/0181196 A1* | 9/2003 | Davidov et al. | ............ | 455/414.1 |
| 2004/0111711 A1* | 6/2004 | Soroker et al. | ................ | 717/136 |
| 2004/0187089 A1* | 9/2004 | Schulz | ........................... | 717/101 |
| 2007/0198562 A1* | 8/2007 | Kulkarni et al. | .............. | 707/101 |
| 2007/0266377 A1* | 11/2007 | Ivanov | ........................... | 717/136 |
| 2008/0155335 A1* | 6/2008 | Klein et al. | ...................... | 714/37 |
| 2008/0270977 A1* | 10/2008 | Nucci et al. | ................... | 717/105 |
| 2010/0031232 A1* | 2/2010 | Glazier et al. | ................ | 717/106 |
| 2010/0114619 A1* | 5/2010 | Birsan et al. | ...................... | 705/7 |
| 2011/0088011 A1* | 4/2011 | Ouali | ............................ | 717/105 |

OTHER PUBLICATIONS

Andrew O'Sullivan, Laura Keyes, and Adam Winstanley, "An Extended System for Labeling Graphical Documents Using Statistical Language Models," W. Liu and J. Lladós (Eds.): GREC 2005, LNCS 3926, pp. 61-75, 2006, © Springer-Verlag Berlin Heidelberg 2006.*

(Continued)

*Primary Examiner* — Thuy Dao
*Assistant Examiner* — Stephen Berman
(74) *Attorney, Agent, or Firm* — Ido Tuchman; Nidhi Garg (57) ABSTRACT

An example embodiment disclosed is a system for automated model extraction of documents containing flow diagrams. An extractor is configured to extract from the flow diagrams flow graphs. The extractor further extracts nodes and edges, and relational, geometric and textual features for the extracted nodes and edges. A classifier is configured to recognize process semantics based on the extracted nodes and edges, and the relational, geometric and textual features of the extracted nodes and edges. A process modeling language code is generated based on the recognized process semantics. Rules to recognize patterns in process diagrams may be determined using supervised learning and/or unsupervised learning. During supervised learning, an expert labels example flow diagrams so that a classifier can derive the classification rules. During unsupervised learning flow diagrams are clustered based on relational, geometric and textual features of nodes and edges.

25 Claims, 7 Drawing Sheets

(56) References Cited

OTHER PUBLICATIONS

Jae-Yoon Jung and Joonsoo Bae, "Workflow Clustering Method Based on Process Similarity," M. Gavrilova et al. (Eds.): ICCSA 2006, LNCS 3981, pp. 379-389, 2006, © Springer-Verlag Berlin Heidelberg 2006.*

Stephen A. White, "The Business Process Modeling Notation (BPMN) Specification," Version 1.0, May 3, 2004, BPMI.org, pp. 1-296.*

In re Venner, 262 F.2d 91, 95, 120 USPQ 193, 194 CCPA 1958.*

White, "Using BPMN to Model a BPEL Process," 2005, BPTrends, downloaded from <url>http://w.bptrends.com/publicationfiles/03-05%20WP%20Mapping%20BPMN%20to%20BPEL-%20White.pdf on Mar. 8, 2015, pp. 1-18.*

Brambilla, "Generation of WebML web application models from business process specifications," 2006, ICWE '06 Proceedings of the 6th international conference on Web engineering, pp. 85-86.*

Dijkman et al., "Graph Matching Algorithms for Business Process Model Similarity Search," 2009, Business Process Management Lecture Notes in Computer Science vol. 5701, 2009, pp. 48-63.*

* cited by examiner

```
indegree ≤ 0
|  outdegree ≤ 0
|  |  numContains ≤ 0  ⟹  [1] Isolated Nodes (269.0/1.0)
|  |  numContains > 0  ⟹  [0] Swimlane (1172.0)
|  outdegree > 0  ⟹  [5] Start Event (746.0/2.0)
indegree > 0
|  indegree ≤ 1
|  |  outdegree ≤ 1
|  |  |  outdegree ≤ 0  ⟹  [2] End Event (633.0)
|  |  |  outdegree > 0  ⟹  [3] Task (1666.0)
|  |  outdegree > 1
|  |  |  outdegree ≤ 2  ⟹  [4] Gateway (709.0)
|  |  |  outdegree > 2
|  |  |  |  numOtherLines ≤ 2  ⟹  [2] End Event** (23.0)
|  |  |  |  numOtherLines > 2  ⟹  [4] Gateway (20.0)
|  indegree > 1
|  |  outdegree ≤ 0  ⟹  [6] On/Off page reference (160.0)
|  |  outdegree > 0
|  |  |  outdegree ≤ 1  ⟹  [8] Join/Merge (382.0)
|  |  |  outdegree > 1
|  |  |  |  outdegree ≤ 2  ⟹  [7] Merge + Gateway (134.0)
|  |  |  |  outdegree > 2
|  |  |  |  |  numVertLines ≤ 1  ⟹  [7] Merge + Gateway (13.0)
|  |  |  |  |  numVertLines > 1  ⟹  [8] Join/Merge (7.0)
```

*Fig. 4*

AUTOMATED RECOGNITION OF PROCESS MODELING SEMANTICS IN FLOW DIAGRAMS

BACKGROUND

The present invention is directed toward an automated approach for extracting formal process models from informal process-flow diagrams.

Business Process Models are key artifacts that are created during the early stages of a business-transformation project. A business process model depicts how various tasks are coordinated to achieve specific organizational goals. Such models are used to build a consensus among the stakeholders during the requirements-elicitation phase and then drive the subsequent transformation phases.

Free-form diagramming tools, such as IBM's Freelance Graphics and Microsoft's Powerpoint and Visio products, are widely used for creating informal sketches of process models. Such tools are easy-to-use, ubiquitous, offer creative expression, and have a low barrier to adoption. However, the designs created using such tools are informal sketches, which are not amenable to automated analysis. Diagrams created using such tools have no formal underpinnings; therefore, they are not amenable to automated analysis. That is, they are not easily adapted for model checking, process improvements, process reuse, bootstrapping process realization, and the like.

Formal models, although desirable, are rarely created (during early design) because of the usability problems associated with formal-modeling tools. Unlike the free-form diagramming tools, formal process-modeling software offer many such benefits, but typically suffer from a high barrier to adoption. This can occur for different reasons, such as complexity, costs, and the requirement of some level of formal training.

SUMMARY

An example embodiment of the present invention is a method for automated model extraction. The method includes receiving one or more documents that contain flow diagrams in diagram formats supported by the documents. A first extracting step automatically extracts flow graphs comprising extracted nodes and edges from the flow diagrams. A second extracting step automatically extracts relational, geometric and textual features for the extracted nodes and edges. A recognizing step automatically learns rules to recognize process semantics based on the extracted nodes and edges, and the relational, geometric and textual features of the extracted nodes and edges. A generating step automatically generates process modeling language code based on the learned rules.

As discussed in detail below, rules to recognize patterns in process diagrams may be determined using supervised learning and/or unsupervised learning. During supervised learning, an expert labels example flow diagrams so that a classifier can derive the classification rules. In the unsupervised system, unlabeled example flow diagrams are received by the classifier. The classifier runs clustering on relational, geometric and textual features of nodes and edges in order to arrive at clusters of flow elements that have common semantics. Again, the classifier derives rules characterizing such clusters which can be applied to disambiguate process semantics in other process diagrams.

Another example embodiment of the present invention is a system including a computer processor and computer readable storage medium coupled to the computer processor. The computer readable storage medium includes one or more documents containing one or more flow diagrams in diagram formats supported by the documents. An extractor is configured to extract from the flow diagrams one or more flow graphs comprising extracted nodes and edges. The extractor also extracts from the flow diagrams relational, geometric and textual features for the extracted nodes and edges. A classifier is trained to recognize process semantics based on the relational, geometric and textual features of the extracted nodes and edges. The system outputs a generated process modeling language code based on the recognized process semantics.

Yet another example embodiment is a computer program product for automated model extraction. The embodiment includes computer readable program code configured to extract flow graphs having extracted nodes and edges from the flow diagrams, extract relational, geometric and textual features for the extracted nodes and edges, learns rules that can recognize process semantics based on relational, geometric and textual features of the extracted nodes and edges, and generate process modeling language code that can be used to recognize process semantics in a flow diagram.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to Figures.

As discussed in detail below, embodiments of the present invention provide an automated approach for extracting formal process models, conforming to a given target metamodel, from informal process-flow diagrams. As used herein, a target metamodel lists a set of process modeling elements. For example, the Business Process Modeling Notation (BPMN) defines a metamodel comprising activities, gateways, events, swimlanes, artifacts and connecting objects.

Figure 1A:
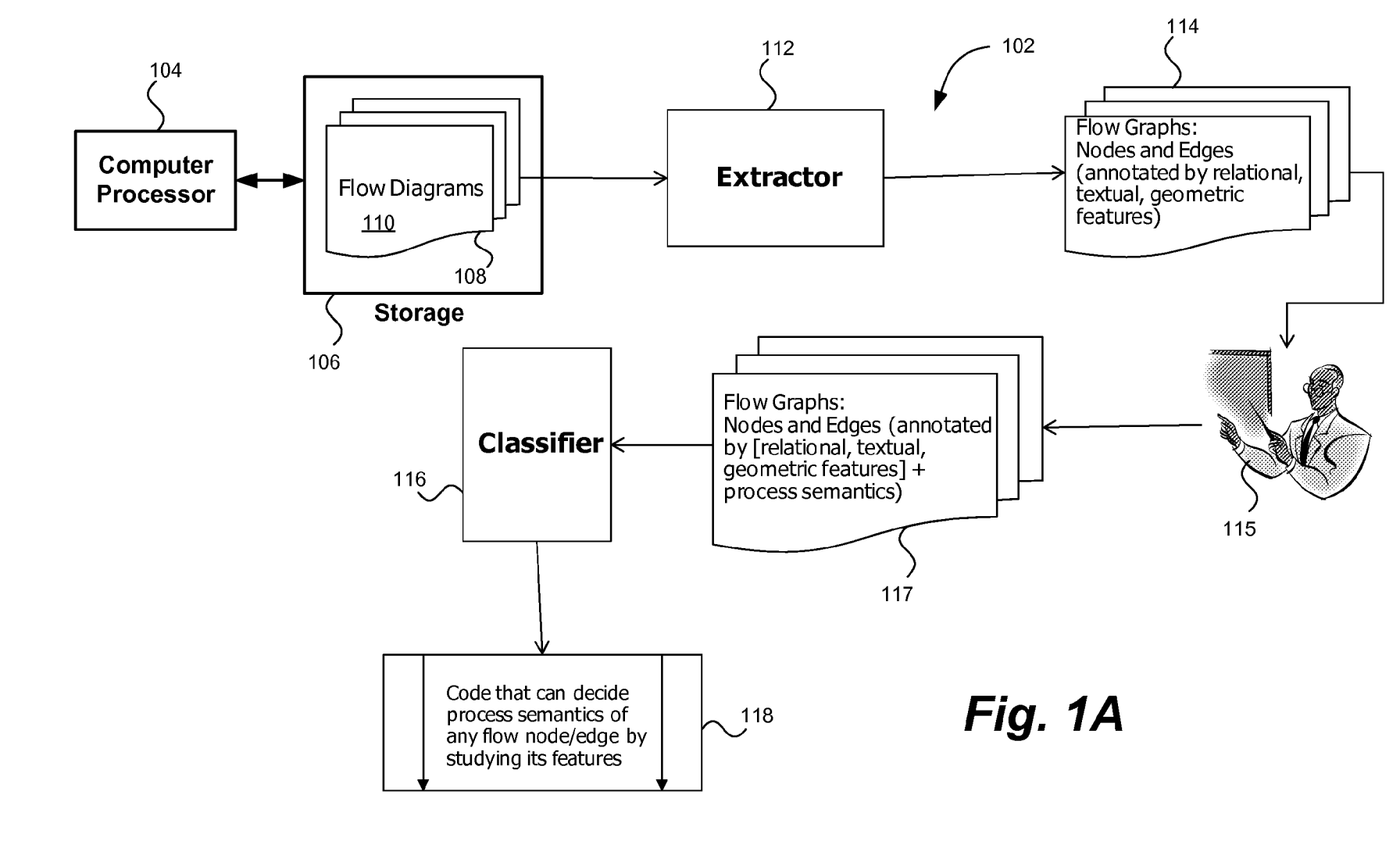
FIG. 1A shows an example supervised system contemplated by the present invention for automated model extraction.

Turning to FIG. 1A, an example supervised system 102 contemplated by the present invention for automated model extraction is shown. The system includes a computer processor 104 and computer readable storage medium 106 (defined below) coupled to the computer processor 104. The computer readable storage medium 106 includes one or more documents 108 containing one or more flow diagrams 110 in one or more diagram formats supported by the documents 108.

An extractor 112 is configured to extract one or more flow graphs 114 from the flow diagrams 110. The flow graphs 114 include extracted nodes and edges, as well as relational, geometric and textual features for the extracted nodes and edges.

A human user 115 then labels all nodes and edges in the flow graphs 114 by their semantics. The set of diagrams for which the corresponding correct process models are used to train a classifier 116, in a supervised manner, to learn classification rules from the labeled instances 117. The learnt rules can be used to infer the semantics of new diagrams.

The classifier 116 is configured to recognize process semantics based on the extracted flow graphs 114. This may be accomplished using a decision tree generated by the classifier 116 for identifying the process semantics. That is, the process semantics are determined based on the extracted nodes and edges, and the relational, geometric and textual features of the extracted nodes and edges. As described in more detail below, the classifier 116 generates process modeling language code 118 based on the recognized process semantics. In a particular embodiment, the process modeling language code 118 is encoded as Business Process Modeling Notation (BPMN).

In one embodiment, the classifier 116 is trained to identify patterns in features of the extracted nodes and edges that indicate a class of process semantic of the respective extracted nodes and edges. This may be accomplished using sample flow diagrams to train the classifier 116.

Figure 1B:
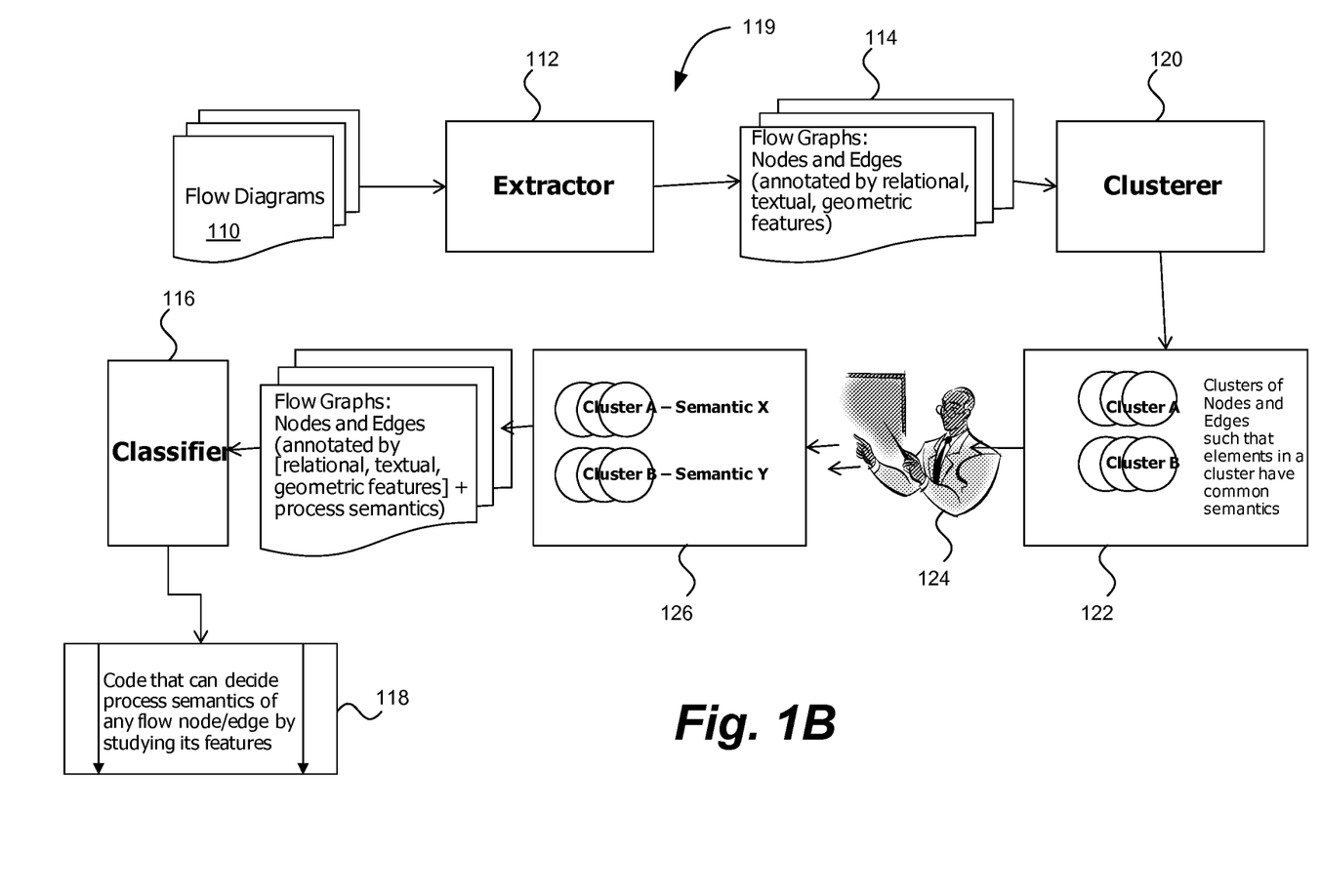
FIG. 1B shows an example unsupervised system contemplated by the present invention for automated model extraction.

FIG. 1B shows an example unsupervised system 119 for automated model extraction contemplated by the present invention. It should be mentioned that some embodiments of the invention may include a hybrid system of supervised and unsupervised automated model extraction.

In this embodiment, the extractor 112 is configured to extract one or more flow graphs 114 from the flow diagrams 110, as discussed above. The flow graphs 114 include extracted nodes and edges, as well as relational, geometric and textual features for the extracted nodes and edges.

A clusterer 120 is configured to cluster nodes and/or edges on the basis of similarity demonstrated in their relational, geometric and textual features. As described in more detail below, the generated clusters 122 are grouped such that elements in a cluster have common semantics.

A human user 124 looks at exemplars from each cluster to determine process semantic of the cluster 122. The nodes and/or edges are then labeled 126 on the basis of the semantics given to each cluster.

In the unsupervised system 119, the classifier 116 establishes correspondence between the features and labels for process semantics. Again, the classifier 116 derives rules characterizing such clusters which can be applied to disambiguate process semantics in any given process diagram. The classifier 116 generates process modeling language code 118 based on the recognized process semantics.

As illustrated in FIGS. 1A and 1B, the automated model extraction approach may be implemented in two independent phases: a structure-inference phase (via the extractor 112) and a semantic-interpretation phase (via the classifier 116). In the structure-inference phase, the approach performs structural inference to identify the set of nodes and edges that constitute a process model.

In the semantic interpretation phase, the approach annotates each node and edge with a process-modeling semantic, defined in the target metamodel. To perform the annotation, the approach implements pattern classification. Specifically, a classifier may be trained on relational, geometric, and textual features of flow elements to perform semantic disambiguation. As discussed below, both supervised and unsupervised approaches for training such a classifier may be used.

As discussed below, embodiments of the present invention enable process engineering to leverage the strengths of both free-form diagramming tools and formal-modeling tools. More importantly, such a facility can help greater industrial adoption of formal methods developed in business process management research.

FIGS. 2A-F illustrate some ambiguities, which present challenges in interpreting the structure and semantics of process models, typically found in real flow diagrams. Inferring the structure and semantics for flow elements is straightforward if each drawing shape is used consistently to convey a single modeling semantic. However, in practice, the following scenarios are extremely common and pose challenges for structural and semantic interpretation.

Figure 2A:
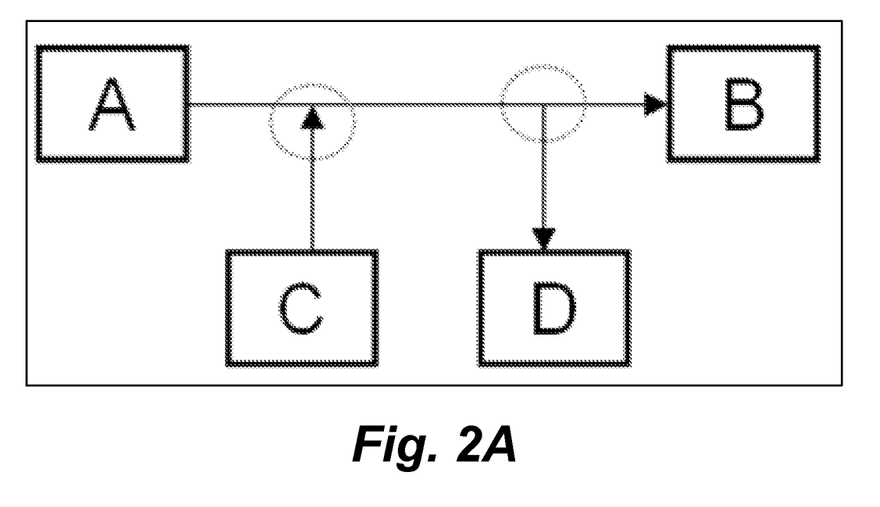
FIGS. 2A-F illustrate some ambiguities, which present challenges in interpreting the structure and semantics of flow models, typically found in real flow diagrams.

FIG. 2A shows, for example, users may join multiple lines to represent a single edge. Moreover, the endpoints of a line may be left dangling (i.e., not be properly glued). In this figure, four edges exist: (A, B), (A, D), (C, B), and (C, D). However, existing tools typically can recognize only (A, B) because it is the only properly glued edge. In other words, existing tools generally recognize a line to be an edge only if the line is properly glued at both ends of two 2D shapes.

Figure 2B:
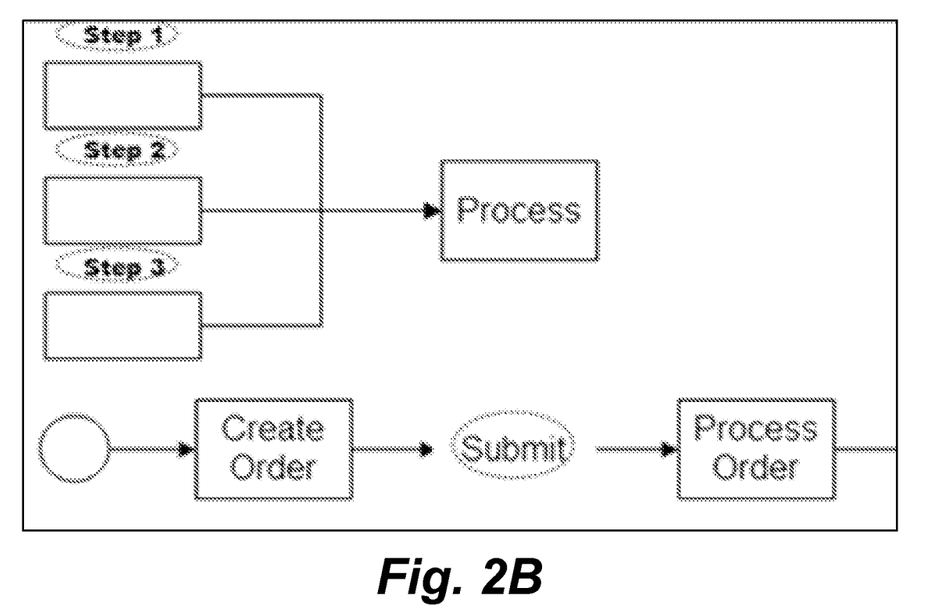

FIG. 2B illustrates unlinked labels. People often use separate drawing shapes to specify a flow element and its text label. In FIG. 2B, "Submit" is intended to be a label on the edge from "Create Order" to "Process Order". Label association becomes a challenge when nearness alone does not suffice to tie unlinked texts with shapes identified as flow elements. Tracking patterns of text label usage may help. For example, if text labels are consistently placed on the top of shapes (e.g., as illustrated by the "Step x" labels in FIG. 2B, that pattern can be applied to resolve ambiguous cases.

Figure 2C:
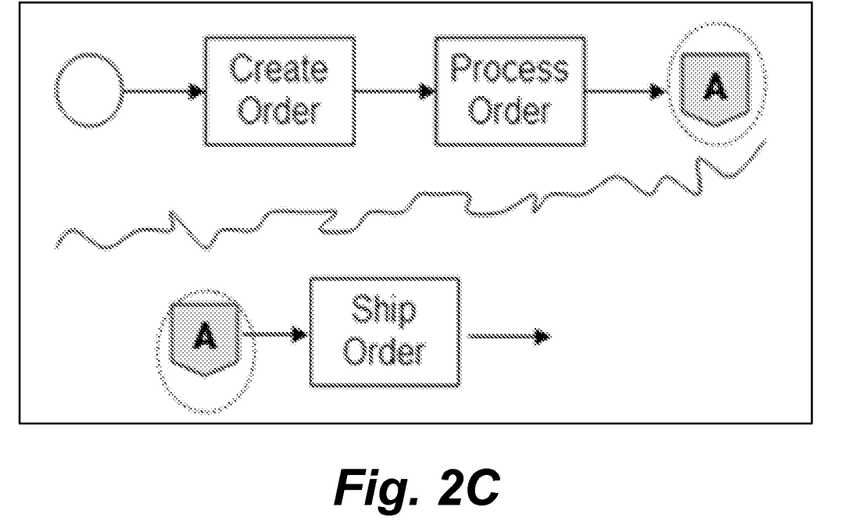

FIG. 2C illustrates unlinked cross-references. Cross-reference linkages across diagrams are often required to split a large diagram across pages for convenience, as shown in FIG. 2C. Use of cross references can occur within a single page as well.

Figure 2D:
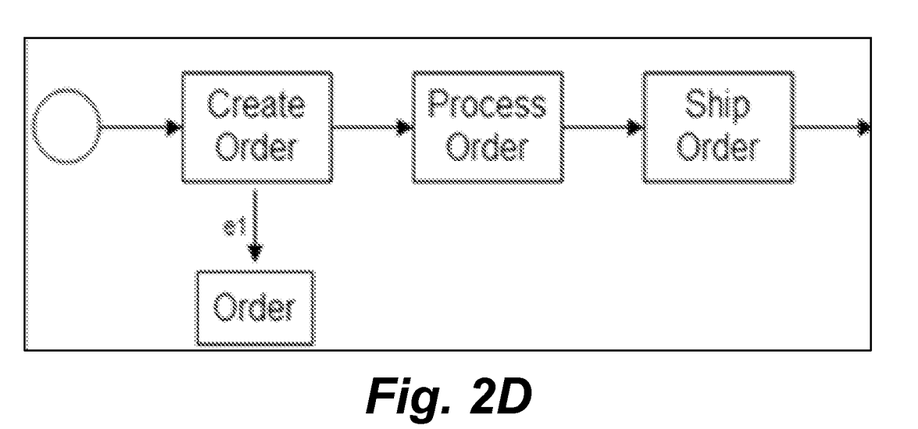

FIG. 2D illustrates under-specification. This occurs when different instances of the same shape are used to convey different semantics. For example, in FIG. 2D, a rectangle is used to denote both the output data artifact "Order" and the step "Create Order". In general, under-specification lowers the effectiveness of a simple shape-based mapping of diagram elements to process model entities.

Figure 2E:
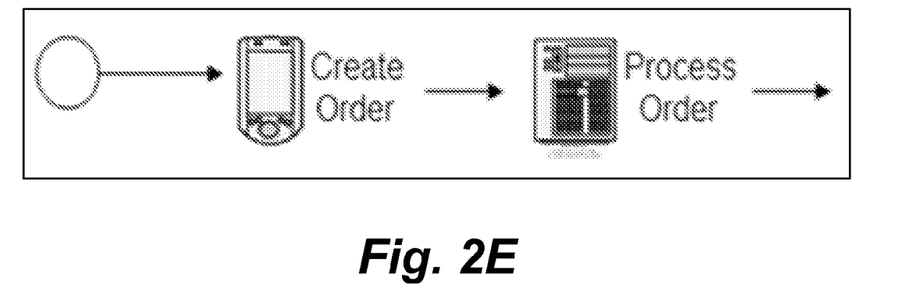

FIG. 2E illustrates over-specification. This occurs when the same semantic is being conveyed by different shapes. In FIG. 2E, both "Create Order" and "Process Order" are activities, but are represented using different graphics. Over-specification too tends to reduce the usefulness of shape-based mapping: the number of shapes to be enumerated by such approaches can become prohibitively large.

Figure 2F:
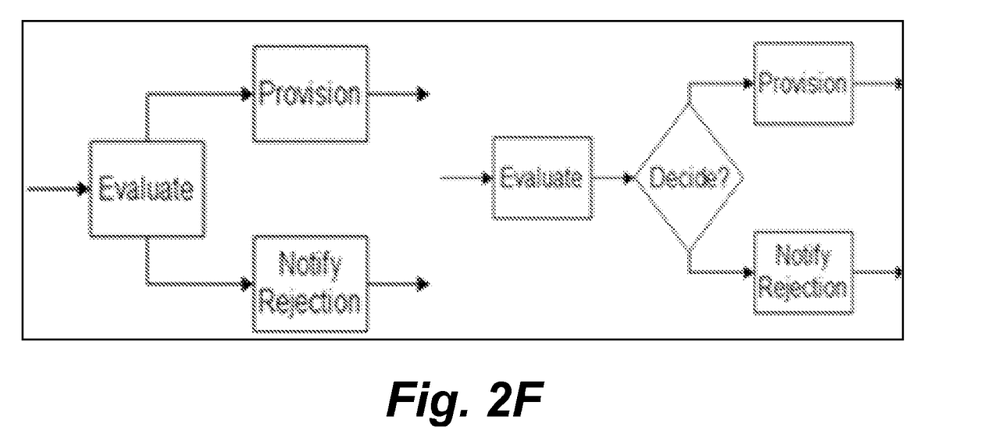

FIG. 2F illustrates fused semantics. In this figure, the two flow fragments are semantically equivalent. The left fragment has an "Evaluate block that represents a fusion of a task and a decision. In the fragment on the right, "Evaluate" and "Decide" are separate entities. Automatic interpretation of such fused semantics is difficult.

A method to recognize process semantics from informal flow diagrams may consist of two phases: structural inference and semantic interpretation. The structural-inference phase takes as input a flow diagram, and extracts a flow graph, which consists of nodes and edges. Additionally, the first phase computes information, such as structure, geometry, and text, for each flow element (i.e., node and edge). The second phase of the algorithm constructs the process model from the flow graph by associating modeling semantics with each flow element using pattern classification. Specifically, this phase applies a classifier that, based on the relational, geometric, and textual features of the flow elements, performs semantic disambiguation. One aspect of the current invention discusses how to train such a classifier, given a set of flow diagrams.

As discussed below, in one embodiment, the classifier is trained to recognize process semantics based on a measured similarity of the relational, geometric and textual features of the extracted nodes and edges. The relational features include the number of incoming extracted edges and the number outgoing extracted edges associated with an extracted node or edge from the extracted nodes and edges. Furthermore, the textual features may include a lexical category of a label associated with an extracted node or edge. The geometric features may include the shape, the number of vertical lines, the number of horizontal lines, the number of arcs, the width, the height, and/or the line style associated with an extracted node or edge from.

One goal of the first phase may be to infer the flow graph nodes and edges. This is done in three steps. First, it parses the input flow diagram to identify the basic diagram elements, which consists of shapes, lines, and text. Second, it constructs the set of nodes, selects candidate edges from diagram elements, and determines associations of text with nodes and candidate edges. Finally, this phase applies an edge-inference algorithm to compute the flow. Thus, the structural inference phase infers a well-formed graph, which has none of the structural ambiguities present in the flow diagram from which it was inferred.

The semantic interpretation phase associates semantics with the nodes and edges in the inferred graph, based on similarity of the nodes and edges. Semantic similarity of nodes and edges quite often follows from similarity in their geometry, relational attributes, and textual content. Semantic disambiguation is formulated as a pattern-classification problem. Using a representative corpus of business process diagrams, a classifier is trained to learn patterns in features of flow elements that indicate the class of process semantic of an element. For semantic interpretation of new diagrams, pertinent features are extracted for each flow element and input into the trained classifier, which detects learnt patterns to decide process semantics. Embodiments may include both supervised and unsupervised schemes for learning that may be used depending upon whether a corpus of diagrams is available for training or not.

In one embodiment, a range of visual and textual cues are analyzed to understand diagram semantics. Such cues as symbolic or numeric features are abstracted and acted upon by standard classifiers.

Table 1 below lists a set of features for nodes, grouped into three categories: relational, geometric, and textual. For each group, the table lists examples of features (column 2), and discusses how the features are indicative of process semantics in nodes (column 3). Relational features such as indegree and outdegree can be obtained directly from the extracted flow graphs, whereas geometric and textual features are aggregated from attributes of the diagram elements involved in the flow. For each process entity, a set of cue words that characterize expressions in the labels for the entity is taken to be a textual feature.

In one embodiment, a textual feature may include a lexical category (e.g., a noun, verb, or query) of a label for an extracted node or edge. For example, interrogative words (e.g., "Whether," "Is," and "Does") in the text are typical of a gateway; similarly, text starting with strong verbs (e.g., "Create," and "Process") indicate an activity. If training data is available, text classification can be performed on labels to identify such representative words for each target entity. Otherwise, these word lists have to be created with inputs from human experts.

TABLE 1

| Category | Features | Comments |
|---|---|---|
| Relation | No. of incoming edges (indegree), no. of outgoing edges (outdegree), no. of nodes contained within (numContains), whether it is contained in another node (isContained) | Can discriminate amongst many entities irrespective of local styles in diagrams. For example, indegree and outdegree can easily distinguish between start, end and intermediate events; non-zero numContains may strongly indicate presence of a swimlane or a group. |
| Geometric | Shape name in stencil, No. of vertical lines, no. of horizontal lines, no. of arcs, line style, width, height | Can provide highly accurate insight, if data sets follow templates very rigorously. Such features can work well with small sets of process diagrams with uniform styles per entity. |
| Textual | No. of cue words for every entity in label for the node and labels for incident edges. | Humans comprehend text to determine semantics in highly ambiguous scenarios. For example, text in outgoing edges from gateways is often 'yes'/'no'/'y'/'n', text in activities typically starts with strong verbs, 'report' and 'e-mail' are common in data objects. |

In one embodiment, if there is a set of diagrams for which the corresponding correct process models are known, a classifier is trained, in a supervised manner, to learn classification rules from the labeled instances. The learnt rules can be used to infer the semantics of new diagrams (see discussion above relating to FIG. 1B). A decision tree learner can formulate a decision task as a sequence of logical or binary operations from a series of examples. It is a set of if-then-else like classification rules over the feature set, which can be easily interpreted (and edited if required) by data mining practitioners. A Naive Bayes classifier, after training on a labeled dataset, can assign probabilities that an observation (flow element) belongs in each class (process entity). Neural networks consist of layers of interconnected nodes where each layer produces a non-linear function of its input, thus enabling the modeling of very general functions. Empirical study can be used to evaluate different classifiers for their efficacy in choosing process semantics for flow elements.

Clustering is a popular and effective technique used in data mining for discovering, without any human supervision, patterns from large amounts of data. An embodiment of the invention cluster flows elements based on their geometrical, relational, and textual features, and hypothesizes that elements with identical process semantics are grouped into the same cluster (see discussion above relating to FIG. 1A). Next, the cluster assignments as class labels are considered for the flow elements and a classifier is trained. The classifier trained in this manner can perform semantic disambiguation, eliminating the need for performing clustering on each new diagram.

A measure of similarity (or distance) is defined such that flow elements in the same cluster exhibit greater similarity in semantics amongst them than with elements in any other cluster. Similarity for each feature category: relational ($sim_r$), geometric ($sim_g$), and textual ($sim_t$). The euclidean distance can be used to compute similarity between numeric attributes, a boolean measure (1 for match, 0 for mismatch) for attributes that can be enumerated (e.g., shape, name, color), and string edit distances (e.g., Levenshtein, Monge Elkan, Jaro) for text. The aggregate feature-based similarity of two flow elements, $f_i$ and $f_j$, is obtained using a linear combination of the three similarity components:

$$\text{sim}(f_i, f_j) = w_r \times \text{sim}_r(f_i, f_j) + w_g \times \text{sim}_g(f_i, f_j) + w_t \times \text{sim}_t(f_i, f_j)$$

The weights for the different components can be set either using domain knowledge about the importance of different aspects of the similarity measure, or, alternatively, by validation over a set of labeled training instances (if available). Given the aggregated similarity measure, there are various clustering approaches, such as agglomerative, divisive, and k-means, for iteratively improving the clustering goodness. The choice of the number of clusters may be governed by knowledge of the number of entities in the target meta-model. After clustering is run, the user can examine a few exemplars flow elements in each cluster to decide a process semantic for the cluster. Then, the semantic classification (thus obtained via clustering) of flow elements from the training corpus is used to train a classifier, and semantic interpretation proceeds as in the supervised case. Empirical studies show that clustering on features similar to those listed in Table 1 indeed groups together elements with common process semantics, and that an unsupervised approach is almost as effective as supervised learning for recognizing certain semantics. In practice, an unsupervised approach is often more applicable because sound training data is hard to obtain.

Figure 3:
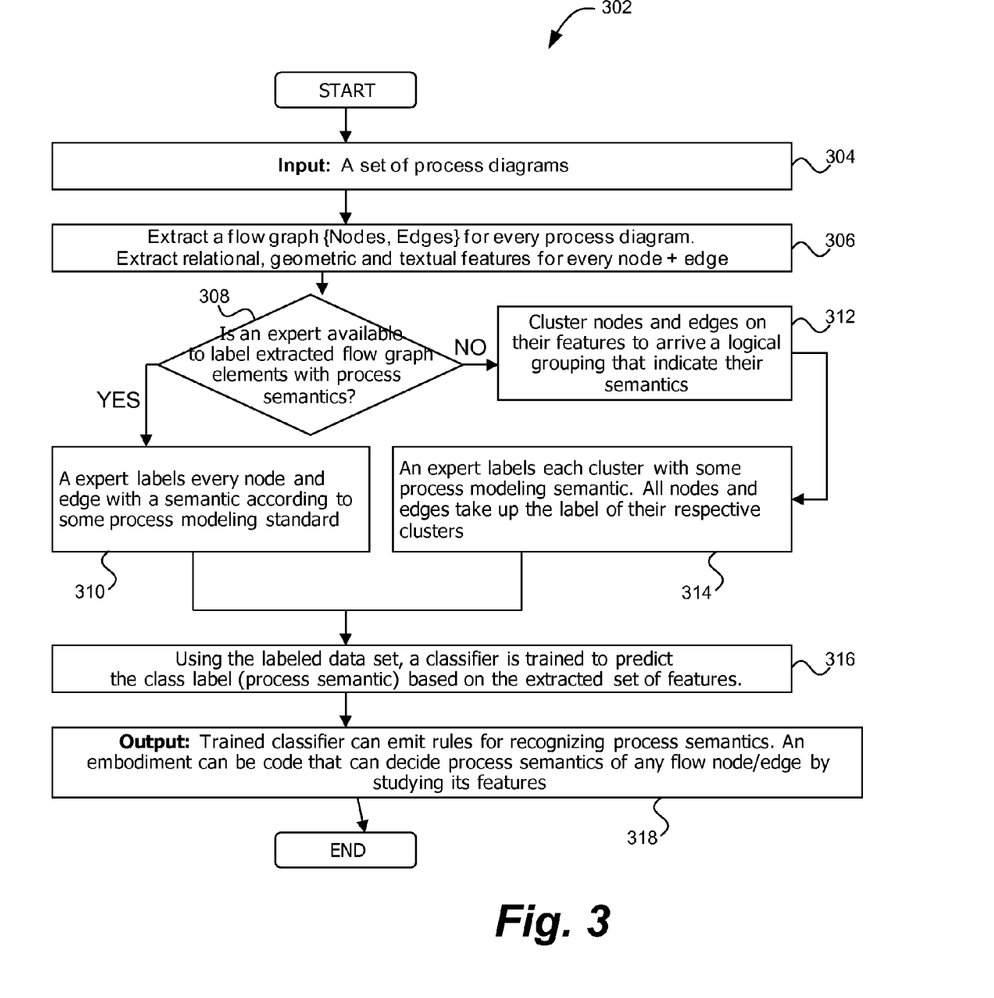
FIG. 3 shows an example flowchart for automated model extraction contemplated by the present invention.

FIG. 3 shows an example flowchart 302 for automated model extraction contemplated by the present invention. The method includes a receiving operation 304 for receipt of one or more documents that contain one or more flow diagrams in one or more diagram formats supported by the documents.

Next, at extracting operation 306, flow graphs that include nodes and edges are extracted from the flow diagrams. As discussed above, during this step a well-formed flow graph is extracted which has none of the structural ambiguities present in the flow diagram from which it was inferred. This step also includes extracting relational, geometric and textual features for the extracted nodes and edges are extracted from the flow diagrams. As discussed above, the textual features may include a lexical category of a label associated with an extracted node or edge. The relational features may include the number of incoming extracted edges and/or the number outgoing extracted edges associated with an extracted node or edge. The geometric features may include the shape, the number of vertical lines, the number of horizontal lines, the number of arcs, the width, the height, and/or the line style associated with an extracted node or edge. After extracting operation 306 is completed, control passes to decision operation 308.

At decision operation 308, the system determines if there is an expert (i.e., human user) available to label extracted flow graph elements with process semantics. If an expert is available, the system can perform supervised training at labeling operation 310. During labeling operation 310, the expert labels every node and edge with a semantic according to a process modeling standard or convention used.

If an expert is not available at step 308, the system can perform unsupervised training at clustering operation 312. During this operation, nodes and edges are clustered based on their features, such as the relational, geometric and textual features discussed above, to arrive at a logical grouping that indicates their semantics.

Once the nodes and edges are clustered, labeling operation 314 is performed. During this operation, each cluster is labeled with process modeling semantic by an expert. All nodes and edges take up the label of their respective clusters. After either labeling operation 310 or 314 is completed, control passes to learning operation 316.

At learning operation 316, a classifier automatically learns rules to recognize process semantics based on the extracted nodes and edges, as well as the relational, geometric and textual features of the extracted nodes and edges. As detailed above, recognition of process semantics may be based on a measured similarity of the relational, geometric and textual features of the extracted nodes and edges.

Figure 4:
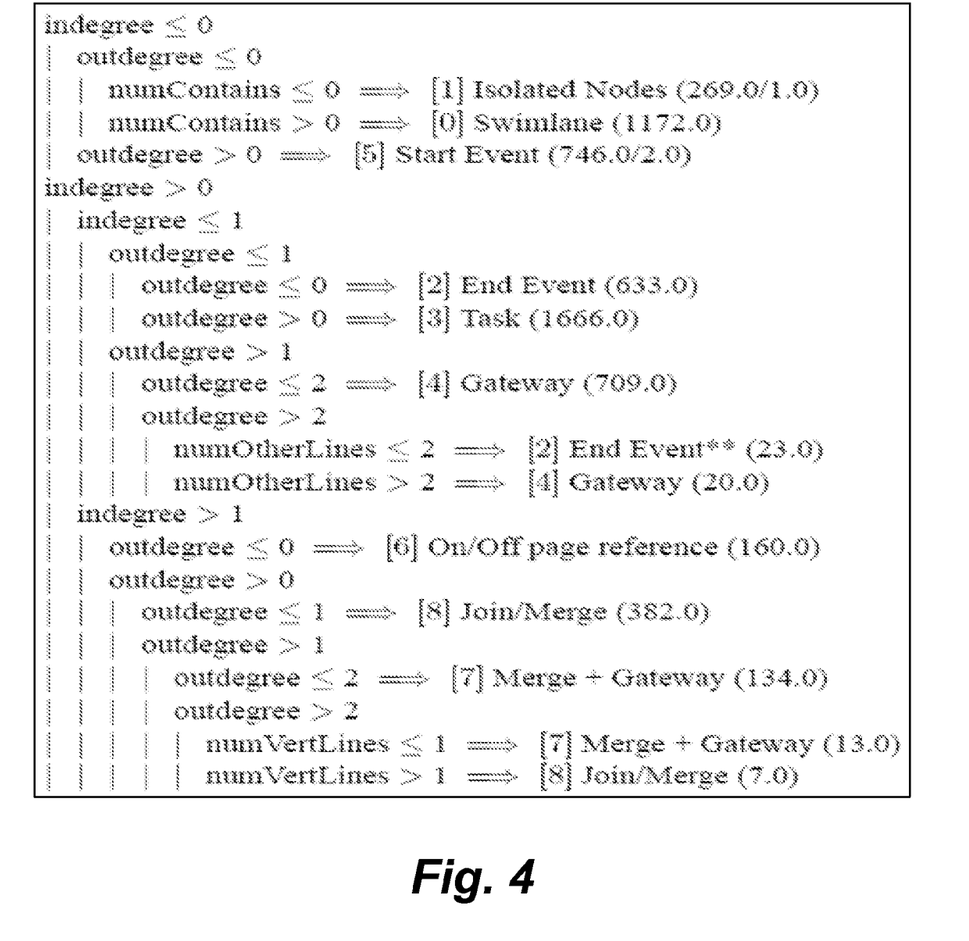
FIG. 4 shows an example decision tree utilized by the classifier to identify process semantics.

At generating operation 318, the trained classifier generates rules for recognizing process semantics. In one embodiment, the generating operation 318 may include generating a decision tree. An example decision tree utilized by the classifier to identify process semantics is shown in FIG. 4. The method may also include training the classifier to identify patterns in features of the extracted nodes and edges that indicate a class of process semantic of the respective extracted nodes and edges.

As discussed above, the classifier training may be achieved in either a supervised system or an unsupervised system. In the supervised system, a plurality of example flow diagrams is received by the classifier. The classifier applies machine learning or statistical learning techniques to identify patterns on relational, geometric and textual features of nodes and edges that are characteristic of process semantics. The classifier then derives rules (see FIG. 4) that may recognize such patterns in any given process diagram to disambiguate process semantics.

In the unsupervised system, a plurality of unlabeled example flow diagrams is received by the classifier. The classifier runs clustering on relational, geometric and textual features of nodes and edges in order to arrive at clusters of flow elements that have common semantics. Again, the classifier derives rules characterizing such clusters which can be applied to disambiguate process semantics in any given process diagram.

Embodiments of the invention may further include generating process modeling language code based on the recognized process semantics. In one embodiment, the modeling language code is encoded as Business Process Modeling Notation (BPMN).

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. Thus, the claims should be construed to maintain the proper protection for the invention first described.

What is claimed is:

1. A method comprising:
   receiving one or more documents that contain a first flow diagram in one or more diagram formats supported by the documents;
   automatically extracting from the first flow diagram one or more flow graphs comprising extracted nodes and edges;
   automatically extracting from the first flow diagram relational, geometric and textual features for the extracted nodes and edges;
   automatically learning rules to recognize process semantics based on the extracted nodes and edges, and the relational, geometric and textual features of the extracted nodes and edges, the rules configured as a decision tree; and
   automatically generating, based on the learned rules, process modeling recognition code to recognize and decide process semantics in a second flow diagram.

2. The method of claim 1, wherein recognition of process semantics is further based on a measured similarity of the relational, geometric and textual features of the extracted nodes and edges.

3. The method of claim 1, wherein the textual features include a lexical category of a label associated with an extracted node or edge from the extracted nodes and edges.

4. The method of claim 1, wherein the relational features include at least one of the number of incoming extracted edges and the number of outgoing extracted edges associated with an extracted node or edge from the extracted nodes and edges.

5. The method of claim 1, wherein the geometric features include at least one of the shape, the number of vertical lines, the number of horizontal lines, the number of arcs, the width, the height, and the line style associated with an extracted node or edge from the extracted nodes and edges.

6. The method of claim 1, further comprising training a classifier to identify patterns in features of the extracted nodes and edges that indicate a class of process semantic of the respective extracted nodes and edges.

7. The method of claim 6, wherein training the classifier includes receiving by the classifier a plurality of example flow diagrams.

8. The method of claim 1, further comprising generating the decision tree for identifying the process semantics.

9. A system comprising:
a computer processor;
computer readable storage medium coupled to the computer processor, the computer readable storage medium including one or more documents containing a first flow diagram in one or more diagram formats supported by the documents;
an extractor configured to extract from the first flow diagram one or more flow graphs comprising extracted nodes and edges, and extract from the first flow diagram relational, geometric and textual features for the extracted nodes and edges;
a classifier trained to learn rules to recognize process semantics based on the relational, geometric and textual features of the extracted nodes and edges, the rules configured as a decision tree; and
generated, based on the learned rules, process modeling recognition code to recognize and decide process semantics in a second flow diagram.

10. The system of claim 9, wherein the classifier is configured to recognize process semantics based on a measured similarity of the relational, geometric and textual features of the extracted nodes and edges.

11. The system of claim 9, wherein the textual features include a lexical category of a label associated with an extracted node or edge from the extracted nodes and edges.

12. The system of claim 9, wherein the relational features include at least one of the number of incoming extracted edges and the number of outgoing extracted edges associated with an extracted node or edge from the extracted nodes and edges.

13. The system of claim 9, wherein the geometric features include at least one of the shape, the number of vertical lines, the number of horizontal lines, the number of arcs, the width, the height, and the line style associated with an extracted node or edge from the extracted nodes and edges.

14. The system of claim 9, wherein the classifier is trained to identify patterns in features of the extracted nodes and edges that indicate a class of process semantic of the respective extracted nodes and edges.

15. The system of claim 14, further comprising a plurality of example flow diagrams to train the classifier.

16. The system of claim 9, further comprising a decision tree generated by the classifier for identifying the process semantics.

17. A computer program product comprising:
a non-transitory computer readable storage medium having computer readable program code embodied therewith, the computer readable program code configured to:
receive one or more documents that contain a first flow diagram in one or more diagram formats supported by the documents;
automatically extract from the first flow diagram one or more flow graphs comprising extracted nodes and edges;
automatically extract from the first flow diagram relational, geometric and textual features for the extracted nodes and edges;
automatically learning rules to recognize process semantics based on the relational, geometric and textual features of the extracted nodes and edges, the rules configured as a decision tree; and
automatically generate, based on the learned rules, process modeling recognition code to recognize and decide process semantics in a second flow diagram.

18. The computer program product of claim 17, wherein recognition of process semantics is further based on a measured similarity of the relational, geometric and textual features of the extracted nodes and edges.

19. The computer program product of claim 17, wherein the textual features include a lexical category of a label associated with an extracted node or edge from the extracted nodes and edges.

20. The computer program product of claim 17, wherein the relational features include at least one of the number of incoming extracted edges and the number of outgoing extracted edges associated with an extracted node or edge from the extracted nodes and edges.

21. The computer program product of claim 17, wherein the geometric features include at least one of the shape, the number of vertical lines, the number of horizontal lines, the number of arcs, the width, the height, and the line style associated with an extracted node or edge from the extracted nodes and edges.

22. The computer program product of claim 17, further comprising computer readable program code configured to train a classifier to identify patterns in features of the extracted nodes and edges that indicate a class of process semantic of the respective extracted nodes and edges.

23. The computer program product of claim 22, further comprising computer readable program code configured to receive by the classifier a plurality of example flow diagrams.

24. The computer program product of claim 17, wherein the computer readable program code configured to automatically generate process modeling recognition code based on the recognized process semantics includes computer readable program code configured to automatically generate the process modeling recognition code based on the learned rules includes forming learned rules based on a number of incoming and outgoing edges, and a number of vertical and horizontal lines of the extracted nodes and edges.

25. The method of claim 1, wherein automatically generating the process modeling recognition code based on the learned rules includes forming learned rules based on a number of incoming and outgoing edges, and a number of vertical and horizontal lines of the extracted nodes and edges.

* * * * *